125,125

UNITED STATES PATENT OFFICE.

CHARLES J. EAMES, OF NEW YORK, N. Y.

IMPROVEMENT IN COMPOSITIONS FOR THE MANUFACTURE OF DRAIN-PIPES, TILES, &c.

Specification forming part of Letters Patent No. 125,125, dated April 2, 1872.

SPECIFICATION.

*To all whom it may concern:*

Be it known that I, CHARLES J. EAMES, of New York, in the county of New York, in the State of New York, have invented a new and Improved Composition to be used in the Manufacture of Drain-Pipes, Pottery, Tiles, &c.; and I do hereby declare that the following is a full and exact description thereof.

The nature of my invention consists in an improved composition to be used in the manufacture of drain-pipes, pottery, tiles, &c., which is formed by treating with an alkaline solution resinous and carbonaceous substances, and then combining them with asphaltum and earth or silicious substances, with or without the addition of caoutchouc, shellac, and gutta-percha, as will more clearly appear in the following specific description to enable others skilled in the art to make and use my invention.

I have found that mixtures composed of rosin, &c., combined with sand in a heated state, are liable when they have cooled to disintegrate—the sand to separate from the resinous components of said mixtures; and the object of my invention is to overcome this tendency and also cheapen compositions of a like utility and formation.

In order to expel all moisture from the sand, it is properly heated in some convenient manner.

The resinous components of my mixture (shellac, asphaltum, and the like) are fused separately in a kettle or other apparatus sufficiently large to avoid the waste from foaming over when the aqueous solutions of the composition are added.

To the fused resinous substance I add my alkaline solution, such as solution of sal-soda, silicate of soda, or any analogous alkaline solution, in small quantities, or gradually keeping the ingredients well stirred while adding the solution used. The highly important result proceeding from this mode of treating the resinous substances with the alkaline solutions is to produce a composition capable of withstanding a much greater degree of heat than the ordinary mixture of the resinous substances with the sand.

This alkaline solution is made by dissolving one part of the alkaline substance used in eight parts of water, and this solution is added to the rosin, so that the quantity of alkaline substance in the solution shall equal in weight the quantity of rosin.

Dissolved caoutchouc or gutta-percha is added in sufficient quantity to the melted rosin after treating the latter with the alkaline solution, and adding thereto the shellac. I dissolve the caoutchouc or gutta-percha in benzole, naphtha, or any of their well-known solvents, and add to the rosin and shellac while dissolved.

I may use any known asphaltum, coal-tar, rosin-tar resulting from the production of gas, or any carbonaceous materials of like nature, combined with small proportions of rosin treated with my alkaline solution. And these substances, when combined with caoutchouc or gutta-percha, render my composition more tough and pliable.

When these several ingredients are thus prepared and compounded, I add a sufficient quantity of sand to produce a composition or mixture of a plastic consistency that can be readily molded into any desired size or form, and when properly cooled is fit for use.

As as an example of one of the proportions which may be used in making my composition I give the following proportions of the ingredients that I preferably use and their weight, which, of course, may be slightly varied:

Of sand, one hundred pounds; of asphaltum, twenty pounds; of caoutchouc, (dissolved,) two pounds; of rosin, (in alkaline solution,) ten pounds; of shellac, one-half pound.

To cheapen and make a more compact mixture I may mix alumina or other substance—like earth, &c.—with the sand; where sand is comparatively scarce, I may mention that I "screen" the sand used.

Having thus fully described my invention, what I claim as new, and desire to secure by Letters Patent, is—

Resinous and carbonaceous substances treated with an alkaline solution, and then combined with asphaltum and earth or silicious substances, with or without the addition of caoutchouc or gutta-percha, so as to form a composition suitable for molding drain-pipes, pottery, tiles, and the like, substantially in the manner above set forth.

CHARLES J. EAMES.

Witnesses:
GEORGE M. DARLEY,
EDM. F. BROWN.